United States Patent [19]
Bojarczuk, Jr. et al.

[11] Patent Number: 5,874,147
[45] Date of Patent: Feb. 23, 1999

[54] COLUMN III METAL NITRIDE FILMS AS PHASE CHANGE MEDIA FOR OPTICAL RECORDING

[75] Inventors: Nestor Alexander Bojarczuk, Jr., Poughkeepsie; Supratik Guha, Yorktown Heights; Arunava Gupta, Valley Cottage, all of N.Y.; Wade Wai-Chung Tang, San Jose, Calif.

[73] Assignee: International Business Machines Corporation, Armonk, N.Y.

[21] Appl. No.: 892,826

[22] Filed: Jul. 15, 1997

[51] Int. Cl.$^6$ ........................................................ B32B 3/00
[52] U.S. Cl. ........................ 428/641; 428/64.4; 428/65.2; 428/698; 428/699; 428/702; 428/913; 430/270.12; 430/495.1; 430/945; 369/283; 369/288
[58] Field of Search ................................ 428/64.1, 64.2, 428/64.4, 65.2, 688, 689, 698, 699, 702, 913; 430/270.12, 495.1, 945; 369/283, 288

[56] References Cited

U.S. PATENT DOCUMENTS

| | | | |
|---|---|---|---|
| 5,470,627 | 11/1995 | Lee et al. | 428/64.4 |
| 5,472,758 | 12/1995 | Birukawa et al. | 428/64.4 |
| 5,498,507 | 3/1996 | Handa et al. | 430/273.1 |

Primary Examiner—Elizabeth Evans
Attorney, Agent, or Firm—Stephen S. Strunck

[57] ABSTRACT

This invention provides phase change media for optical storage based on semiconductors of nitrides of the column III metals. The surface of thin films of these wide bandgap semiconductors may be metallized (by desorption of the nitrogen) by irradiating with photons of energy equal to, or greater than the band gap of these materials, and with power densities beyond a critical threshold value. As a consequence of such writable metallization, these materials are excellent candidates for write once, read many times storage media since the differences in the reflectivity between the metal and its corresponding wide gap nitride are very large. Furthermore, once the nitrogen is desorbed, the written metallic phase can no longer revert back to the nitride phase and hence the media is stable and is truly a write-once system. Additional advantages offered by these materials over present day phase change media include higher differences in reflectivity contrast and suitability for use with short wavelength laser diodes (460 nm and lower) which are expected to be introduced into optical recording technology in the next 5 years. The band gap of alloys of nitrides of column III metals can be tuned by changing the relative fractions of the column III metals to continuously vary the band gap so as to be compatible with lasers having photon energies within the range. The low absorptivity and hence high transmissitivity, at the appropriate recording wavelength, of the starting phase also offers the potential application of these materials in a multiple-recording-layer format.

44 Claims, 7 Drawing Sheets

COLUMN III METAL NITRIDE FILMS AS PHASE CHANGE MEDIA FOR OPTICAL RECORDING

BACKGROUND OF THE INVENTION

1. Field of the Invention

This invention relates to optical recording media for memory applications generally and particularly to the use of nitrides of column lll metals as the materials for phase change media for optical recording, especially write once, read many times optical recording.

2. Background

In optical recording for memory applications, a focused incident beam, e.g. from a semiconductor laser, reads or writes bits onto a thin film of appropriate material (media). Writing (encoding) is generally done by either changing the magneto-optic properties of the media or the reflectivity of the media to form a bit, the bit being the region of material irradiated and heated by the focused beam as the beam is scanned (rastered) over the surface of the media and varied in intensity as by being pulsed on and off. In the read operation the laser beam is incident on the bit and the reflected beam is modulated either in terms of a change in polarization (for magneto-optical recording) or reflectivity (for phase change alloys, organic dye/polymer, or ablative media). The present invention addresses phase change media.

Phase change media can be used for applications involving "write once read many" (WORM) as well as erasable optical storage. The present invention is directed primarily to WORM systems. Typical WORM materials currently used are tellurium (Te) or selenium (Se) based films which are based on ablation of material to create reflectivity change. Also used are InSbSn or other metallic alloys that rely on an amorphous to crystalline phase transition for the reflectivity contrast. There are a few drawbacks to these materials. Firstly, since there is the possibility for recrystallization of the phases, stability of storage is an issue. Secondly, Te and Se are unstable in air and are toxic. Thirdly, the reflectivity difference or signal contrast (which is normally defined as $|(R_w-R_s)/(R_w+R_s)|$ with $R_s$ and $R_w$ being the reflectivity of the starting phase and written phase, respectively) in these materials is in the range of 20–30%. Thus, there is a need for phase change media that offer improved performance relative to the above mentioned three points. Furthermore, it is expected that within the next five years shorter wavelength (600 nm and lower) semiconductor injection lasers will be introduced for higher storage densities, and thus there is need for phase change media compatible with these lasers.

SUMMARY OF THE INVENTION

This invention provides phase change media for optical storage based on semiconductors of nitrides of the column lll metals. The surface of thin films of these wide bandgap semiconductors may be metallized (by desorption of the nitrogen) by irradiating with photons of energy equal to, or greater than the band gap of these materials, and with power densities beyond a critical threshold value. As a consequence of such writable metallization, these materials are excellent candidates for write once, read many times storage media since the differences in the reflectivity between the metal and its corresponding wide gap nitride are very large. Furthermore, once the nitrogen is desorbed, the written metallic phase can no longer revert back to the nitride phase and hence the media is stable and is truly a write-once system. Additional advantages offered by these materials over present day phase change media include higher differences in reflectivity contrast and suitability for use with short wavelength laser diodes (460 nm and lower) which are expected to be introduced into optical recording technology in the next 5 years. The band gap of alloys of nitrides of column lll metals can be tuned by changing the relative fractions of the column lll metals to continuously vary the band gap so as to be compatible with lasers having photon energies within the range. The low absorptivity and hence high transmissitivity, at the appropriate recording wavelength, of the starting phase also offers the potential application of these materials in a multiple-recording-layer format.

BRIEF DESCRIPTION OF THE DRAWINGS

The above and other advantages of this invention will become more apparent from the following description taken in conjunction with the accompanying drawings, in which.

DETAILED DESCRIPTION OF THE INVENTION

This invention provides phase change media for optical storage based on semiconductors formed of nitrides of the column (group) III metals of the periodic table and nitrogen, e.g., AlN, InN and GaN. Alloys of the column III metals with nitrogen, e.g., InGaAlN, have been found to be useable and to offer unique properties in that their bandgaps can be tailored, or tuned, by adjusting the alloy composition to thereby match the wavelength of the beam used for writing.

Figure 1:
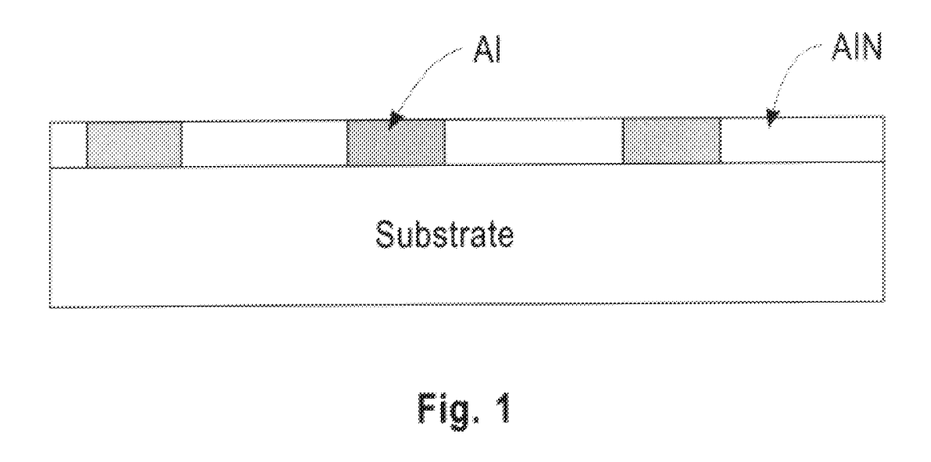
FIG. 1 is a schematic cross-section of a phase change optical storage media structure.

FIG. 1 shows the structure of an AlN phase change media in schematic cross-section. To form this structure, AlN was deposited onto a sapphire substrate by directing evaporated Al and reactive nitrogen created by radio frequency (rf) discharge towards the substrate in high vacuum. The choice of substrate can be varied; sapphire is used as an example only. Also, the rf deposition technique is an example and other deposition techniques may be used. The AlN thin film in this case was about 300 nm thick. Following deposition, the sample was removed from the vacuum chamber and the surface of the AlN irradiated with 248 nm ultraviolet (uv) light radiation from an excimer laser. The radiation was supplied at an energy density of 100–200 mJ/cm² in short nanosecond pulses. This irradiation resulted in preferential desorption of the nitrogen leaving behind metallic aluminum, presumably due to the rapid heating effect of the laser beam. The radiation was focused through an optical microscope system and the 248 nm wavelength focused spot was scanned across the surface in an appropriate fashion to write bits consisting of discrete regions of high reflectivity Al in a non-reflective matrix of AlN as shown in FIG. 1. Such reflective regions when periodically interspersed with non-reflective (or less reflective) matrix regions of AlN constitute encoded (stored) information in the form of "1s" and "0s" (or bits).

Figure 2:
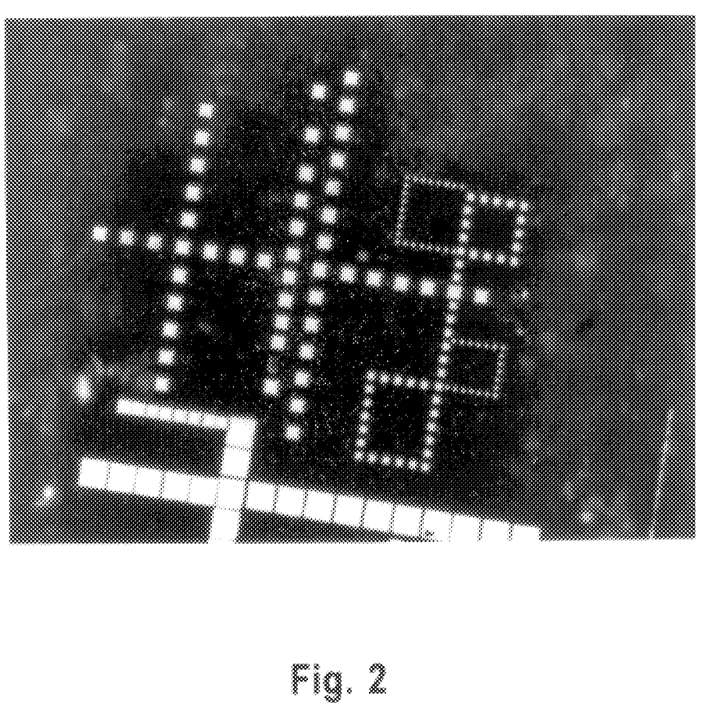
FIG. 2 is an optical reflection micrograph taken in normal incidence mode showing metallized patterns of Al on AlN.

The read operation may be carried out by scanning the same laser beam at a lower power level that is sufficiently below the write threshold of the media and detecting the reflectivity change between the Al bits and the AlN matrix. FIG. 2 shows an optical micrograph taken in the reflection mode in a metallurgical microscope at 80× of Al features patterned by the above process on an AlN thin film. As shown in FIG. 2, the lateral dimensions of the metallized areas are comparable to the lateral dimensions of the focussed light beam from the laser.

Figure 3:
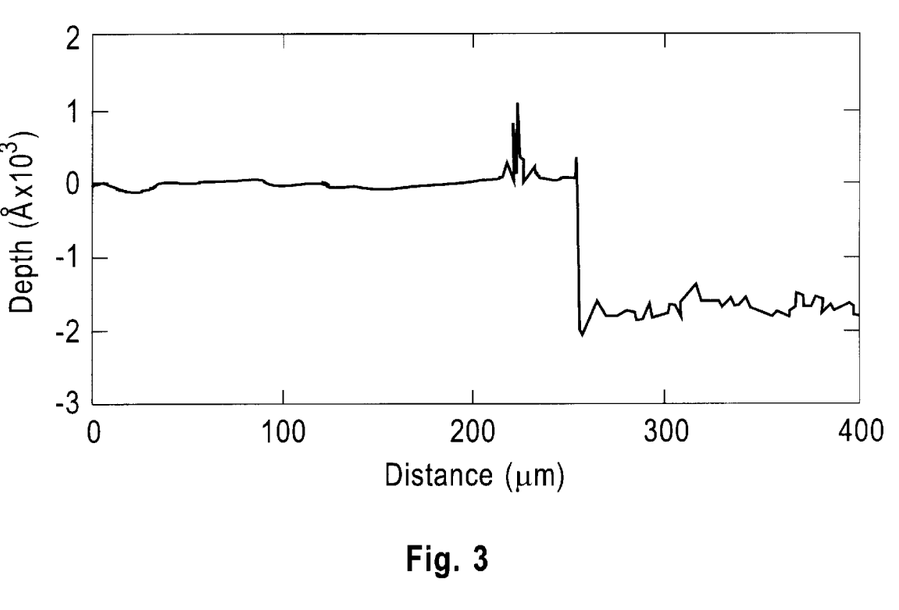
FIG. 3 is a surface profiler trace across the surface of the metallized pattern of FIG. 2 after the metallized Al is etched away.

In order to determine the metallization depth, z, the Al was etched away with aqua regia and the depth of the etched trench measured by a surface profiler. The results are shown in FIG. 3 which gives a value for z of about 150–200 nm. The metallization depth is believed to be limited by the absorption depth for the photons.

For a direct gap semiconductor, when the photon energy is less than the band gap of the semiconductor, the absorption coefficient is near zero and transmission of the light will occur. For photons with energies near and above the band gap, the absorption coefficient is no longer near zero and absorption of the light will occur. For the AlN film, absorption of the 248 nm photons results in the preferential desorption of the nitrogen and the formation of Al. Once the Al layer is formed, its high reflectivity reflects the incident light away and the process of metallization self limits. The band gap of AlN at room temperature is 6.2 eV, which corresponds to a photon wavelength of 200 nm. On the other hand, absorption appears to occur at 248 nm or, equivalently, 5 eV. Absorption at this lower value is believed to be due to the presence of states in the band gap and also due to the highly non-equilibrium nature of the reaction. Incidence of a short pulse of intense radiation can create instantaneous local temperature spikes and consequently shift of the band gap to lower energies. Also, disordering of the local bonding configuration during light absorption can also shift the band edge. The temperature dependence of the AlN band gap is not known. Taking the value known for GaN, which is $6 \times 10^{-4}$ eV/K, it is found that for a temperature rise of 1000° K. the band gap would reduce by about 0.65 eV. Thus it is plausible that temperature effects may also partially contribute to the absorption at reduced wavelengths. Further, to apply this material system to a multiple-recording-layer media, a material that has a bandgap energy slightly above the recording photon energy would be chosen so as to maximize transmission.

Figure 4:
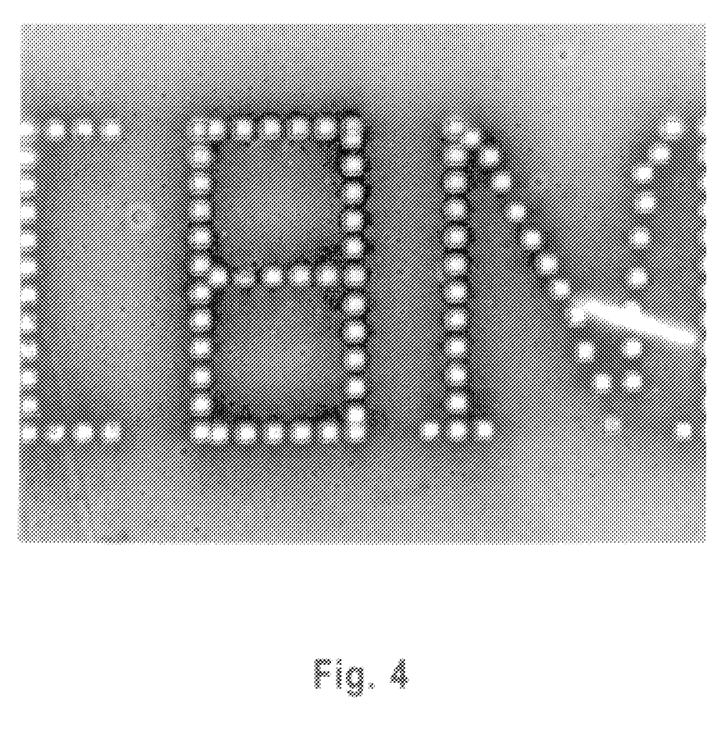
FIG. 4 is an optical reflection micrograph taken in normal incidence mode showing metallized patterns of ln on lnN.

The above metallization process was also demonstrated for the compounds InN and GaN. As an example, FIG. 4 shows an optical micrograph at 80×of features metallized onto an InN thin film. Similar results were obtained for GaN films. Thus the continuous series of alloys formed by InGaAlN are also expected to exhibit similar metallization behavior.

Although the band gaps of nitrides with single column three metals are single-valued, e.g., 1.9 eV for InN, 3.4 eV for GaN and 6.2 eV for AlN, it has been found that alloys of these metals with nitrogen have band gaps that can be adjusted (tuned) by varying the ratios of the metals in the alloy. Thus, in accordance with this invention, optical phase change media can be made from these alloys that are compositionally tuned for a desired band gap for operation with photon energies that that can be selected anywhere in the bandgap range. In the case of InGaAlN, this range can vary from 1.9 to 6.2 eV. This is particularly attractive since short wavelength semiconductor injection lasers are expected to be introduced shortly for optical recording and these lasers have photon energies corresponding to 2.9 eV (420 nm) and higher; thus the InGaAlN phase change media will be compatible with these lasers. For instance, if the laser wavelength is 380 nm (or 3.25 eV photon energy), an $In_{0.7}Al_{0.3}N$ alloy would be useable as a phase change media since it corresponds to a band gap energy of 3.25 eV. The metal remaining after denitridation would be an alloy of Al and In. Generally, these alloys have the composition $A_xB_yC_{1-x-y}N$ where A, B, and C are different column lll metals and x and y are numbers between 0 and 1.

The above discussion assumes that the metallization requires photons with energies near or above the band gap of the nitride semiconductor so that absorption can occur, leading to the metallization. To demonstrate that the assumption is correct, a 355 nm light from a frequency tripled Nd:YAG laser was used to irradiate a GaN thin film and an AlN thin film using the same incident power, i.e., 200 mJ per $cm^2$. The band gap of GaN is 3.4 eV, which corresponds to a photon wavelength of 360 nm. The incident radiation thus had an energy close to the band gap for GaN. On the other hand, the band gap of AlN is 6.2 eV, corresponding to a photon wavelength of 200 nm. The incident light thus corresponds to an energy much less that the AlN band gap and no absorption in AlN was expected to take place. Upon irradiation, it was found that the surface of GaN readily metallized to Ga, but no change was observed on the AlN surface, completely in agreement with expectations. Thus the band gap of the nitride media has to be close to or below the photon energy for metallization to occur.

The nitride based media of the invention have several advantages over present phase change media. First, the reflectivity change depends on a change in the chemical nature from the metal-nitride to the metal. This change is far more robust and stable and is truly irreversible, in contrast to presently used phase change media that switch from a crystalline to amorphous phase (or visa versa) where the possibility for recrystallization always exists. Hence the material systems of the invention are more advantageous for WORM applications. In the case of AlN, the metallized Al has remained stable and shiny to the eye for about 2 months in the ambient and is expected to remain so since Al is protected by a very thin (self limiting) film of aluminum oxide that is transparent down to wavelengths of 180 nm.

Figure 5:
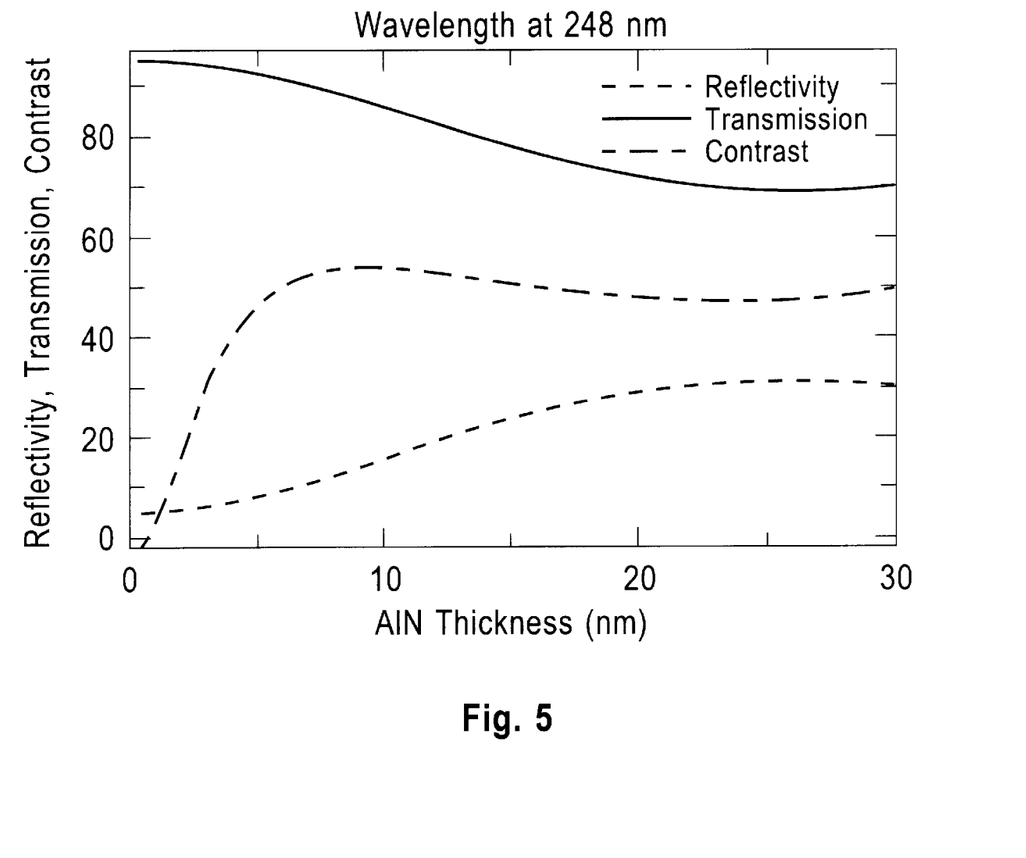
FIG. 5 shows the calculated reflectivity, transmissivity, and contrast for an AlN film as a function of thickness at a wavelength of 248 nm.

Second, the reflectivity of a 20 nm thick Al film for normal incidence radiation is about 80% for photons with wavelengths in the 200 nm to 700 nm range. For AlN, the reflectivity is about 28% for a 20 nm thick film leading to a calculated value of contrast for the Al/AlN system of about 48%, as illustrated in FIG. 5. This high value of signal contrast will provide good signal to noise ratio for this material system and is much larger than that available for current phase change media which has typical signal contrast in the range of 20–30%.

Third, the nitride semiconductors described above are hard, chemically inert, and non-toxic. They thus have far more robust physical properties compared to present Se and Te based phase change media which degrade in air and are toxic.

As noted earlier, write or metallization operations require about 100 mJ/cm². Pulse widths are about $10^{-9}$ sec. Thus, the power requirement is about $1\times10^8$ W/cm². For optical recording at 400 nm wavelength, for example, the focused spot diameter (using a focussing lens with a numerical aperture of 0.5) is diffraction limited to about 400 nm, i.e. a spot area of $1.2\times10^{-9}$ cm². This requires a laser with about 125 mW, with the power to be supplied in a pulsed and not a continuous (cw) mode. Furthermore, as described earlier, this power level desorbed nitrogen from a film of AlN of approximately 150 nm thick. For practical application in a optical storage media, a thickness of 15 nm is more than sufficient. At 15 nm, the energy required to desorb nitrogen would expected to be much less. Thus a lower incident power level would be pulses of photons at approximately 25 to 30 mW.

Figure 6A:
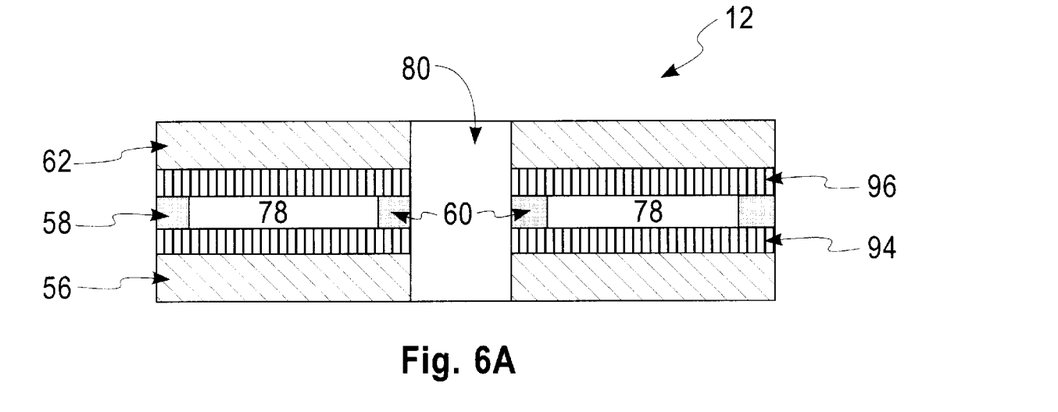
FIGS. 6A, B and C show three configurations of multi-layer optical recording disks utilizing the phase change media of the invention.
Figure 6B:
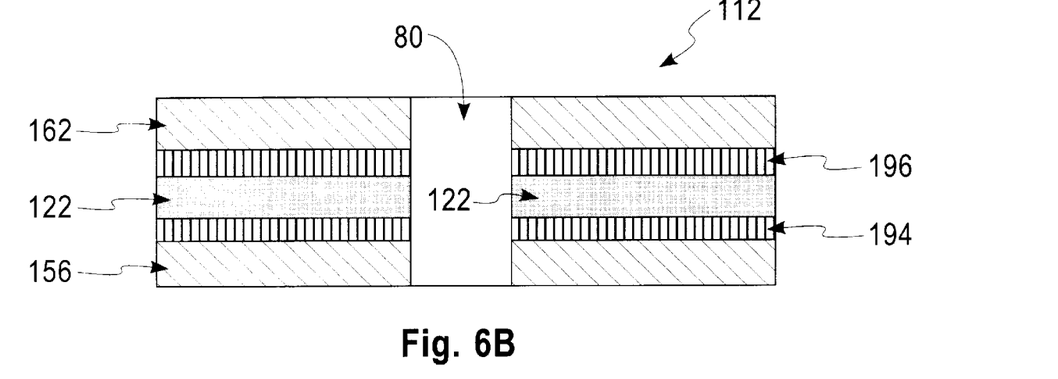
Figure 6C:
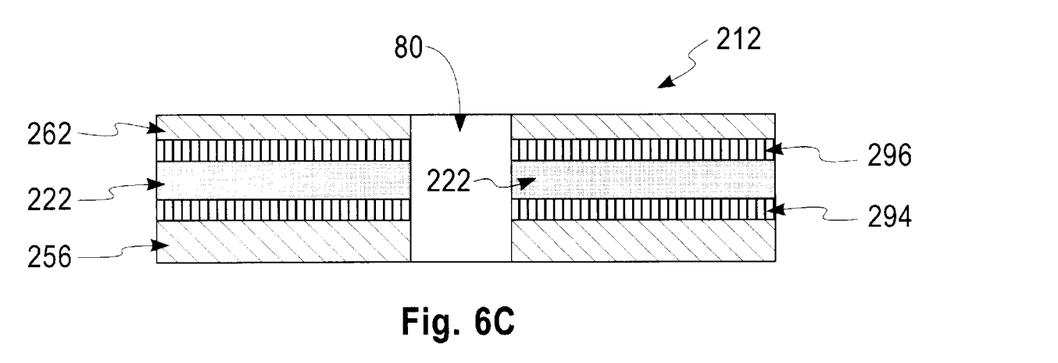

The (InGaAl)N system described above can also be used for multilayer WORM applications. In a multi-layer application, the optical disk has a light transmissive substrate onto which the laser light is incident. The substrate supports at least two spatially separated active recording media. The disk with a center hole 80 for mounting onto to spindle shaft in a drive, can be either an air-gap structure wherein each recording media is supported on a separate substrate (FIG. 6A), or a solid structure wherein a solid light transmissive spacer layer separates the recording medium (FIGS. 6B and 6C). In FIG. 6A, the read/write laser beam is incident onto disk 12 through a transmissive substrate 56. The focal point of the laser beam can be adjusted to address one of the active media, here 94 and 96. When focused on 94, medium 96 is out-of-focus so cross-talk from this layer is minimal if the separation between the two recording media (in this case air gap 78) is larger than about 10 microns. Conversely, if the beam is focused on medium 96, the light going through medium 94 is sufficiently defocused so as not to contribute to the dynamic signal detected from medium 96.

Disk 12 can be made by depositing active media 94 and 96 onto two separate substrates 56 and 62, respectively, to form a layer/substrate pair. The two substrates can then be mounted (stacked) together, forming an air gap 78, with the active media facing each other by using an outer and inner spacing glue rings 58 and 60, respectively. Alternatively, a solid structure can be formed as shown in FIGS. 6B and 6C. In FIG. 6B, active media 194 and 196 can be deposited onto two separate substrates 156 and 162, respectively. The two substrates can then be mounted together with the active medium facing each other by using glue layer 122 which is transmissive to the read/write beams. For uniformity purposes, the transmissive glue layer can be spin-coated on medium 194 and then combined with medium 196 face-to-face or otherwise stacked. Yet another way is shown in FIG. 6C. In this case, active recording medium 294 is deposited on transmissive substrate 256. A transmissive spacer layer 222 is then deposited on medium 294. A second recording medium 296 can now be deposited on spacer layer 222. This is followed by depositing a protective overcoat 262 on topmost medium 296.

Figure 7A:
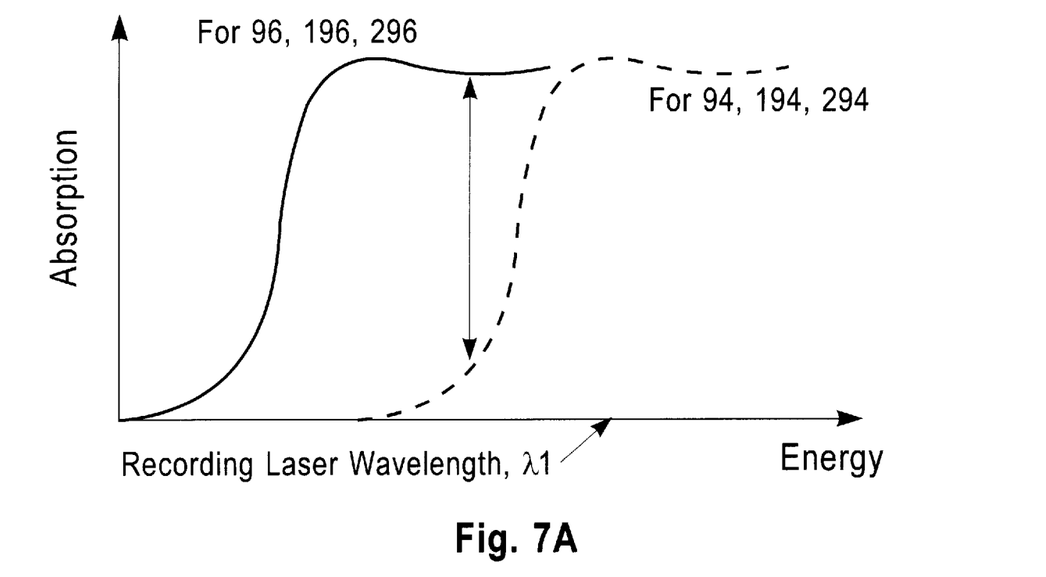
FIG. 7A shows the desired absorption characteristics for multi-layer optical recording disks of FIGS. 6A, B and C when the recording laser has a single wavelength.

There are two methods to address the multi-layer disks described above. One uses a single wavelength laser source and the other uses a multiple wavelength source (such as two separate laser diodes with different wavelengths). In the first method, using a single recording wavelength laser, the recording layer closest to the light source (for example, medium 94) should be semi-transparent so as to allow enough photons to pass through and reach the second layer (medium 96) for writing and reading with a sufficient signal-to-noise ratio. However, medium 94 can't be totally transparent since it needs to have sufficient absorption for the medium to change phase at a reasonable incident laser power level. Thus, the absorption and transmission of the medium 94 and 96 need to be designed accordingly. The desirable transmission of layer 94 should be somewhere between 40% to 80%. Absorption for layer 96 should be as high as possible so as to have a sensitive recording medium since only a fraction of the incident light can reach this layer through layer 94. Transmission of medium 96 is non-critical since layer 96 is the last recording layer of disk 12. The desirable absorption characteristics of medium 94 and 96 are schematically illustrated in FIG. 7A. At the recording wavelength $\lambda_1$, the absorption for medium 94 is small (dotted curve) whereas it is very large for medium 96 (solid line). The material system of $A_xB_yC_{1-x-y}N$ is particularly ideal for this application, especially where the number of layer desired exceeds two, since the band gap, and hence the absorption, of each individual recording medium can be adjusted and controlled by varying the composition.

Figure 7B:
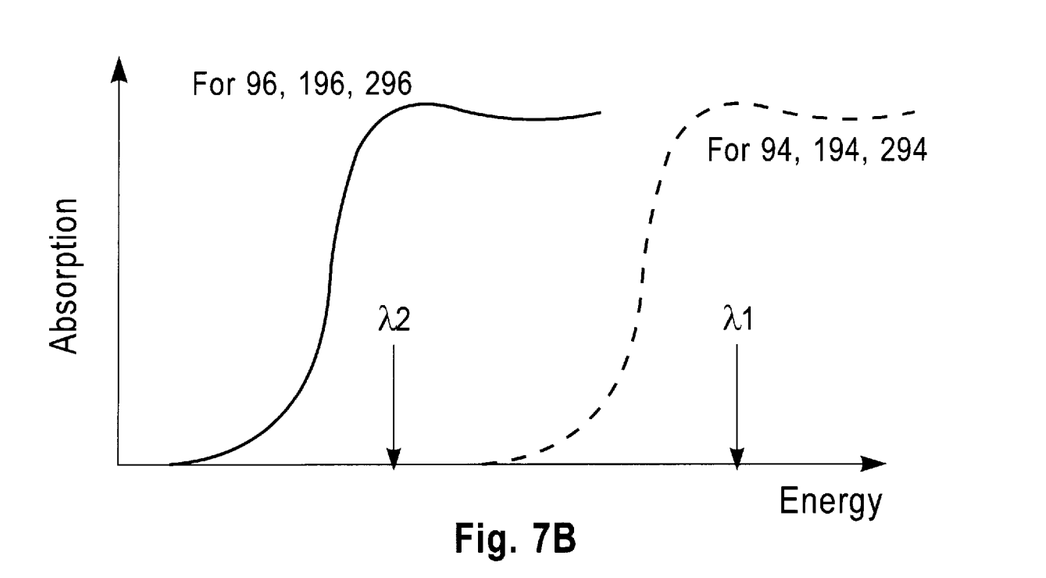
FIG. 7B shows the desired absorption characteristics for multi-layer optical recording disks of FIGS. 6A, B and C when the recording laser has multiple wavelengths.

In a second manner, using multiple recording wavelengths, the bandgap of medium 94 should be larger than that of medium 96. A recording laser with wavelength at $\lambda_1$ is used to read and write on medium 94. Whereas a second recording laser with wavelength at $\lambda_2$ (with $\lambda_2>\lambda_1$) is used to read and write on medium 96. This is schematically shown in FIG. 7B. With $\lambda_2>\lambda_1$, the photons from the second laser can pass through medium 94 without perturbation and can freely address medium 96. The first laser at $\lambda_1$ is restricted to address medium 94 only. This can be done by restricting the focusing lens movement for the first laser so as to not allow the beam to focus onto medium 96. However, because medium 94 is strongly absorptive at $\lambda_1$, the transmission should be relatively small anyway and hence the amount of photons at $\lambda_1$ passing through medium 94 should be minimal.

While this invention has been described in terms of preferred and alternate embodiments, those skilled in the art will appreciate many modifications which may be made without departing from the spirit and scope of the invention. For example, other beam means, such as a focussed electron beam, may suitably be employed for writing. Also, the same laser or beam means used for writing need not necessarily be used for reading in that it may be advantageous to employ one laser to write and another one to read or to use one beam means to write and a different type beam means to read. And, while described in terms of WORM applications, the invention is also applicable to writing once on a master disk which is then subsequently used to produce many read only disks. Accordingly, all such modifications are intended to be included within the scope of the claims appended hereto.

What is claimed is:

1. An optical recording medium consisting of a thin film of a metal nitride of composition MN situated on a substrate where M is a metal selected from the column III metals and N is nitrogen.

2. The optical recording medium according to claim 1 wherein M is a metal selected from the group consisting of aluminum, gallium, and indium.

3. The optical recording medium according to claim 1 wherein said substrate is sapphire.

4. An optical recording medium consisting of a thin film of a metal alloy of composition $A_xB_yC_{1-x-y}N$ situated on a substrate where A, B and C are different column III metals, x and y are numbers between 0 and 1 and N is nitrogen.

5. The optical recording medium according to claim 4 wherein A is indium, B is gallium and C is aluminum.

6. The optical recording medium according to claim 4 wherein said substrate is sapphire.

7. A system for the processing of information comprising:
a) an optical recording medium consisting of a thin film of a metal nitride of composition MN situated upon a substrate where M is a metal selected from the column III metals and N is nitrogen;
b) beam means for selectively irradiating regions of said medium to selectively convert discrete regions of said medium to the metal nitride to thereby form metallized regions of high reflectivity embedded in the metal nitride matrix, which metallized regions and matrix regions constitute encoded information; and
c) means for scanning said beam means across the surface of said medium.

8. The system of claim 7 wherein said irradiation produces a localized heating effect.

9. The system of claim 7 wherein the lateral dimensions of said metallized regions are comparable to the lateral dimensions of said beam.

10. The system of claim 7 wherein said beam means are a laser.

11. The system of claim 7 wherein the energy density of the beam for encoding is on the order of about 100 millijoules per square centimeter and the beam is delivered in a pulsed mode with a pulse time of a few nanoseconds.

12. The system of claim 11 wherein the diameter of the focussed beam is approximately equal to the wavelength of the beam.

13. The system of claim 10 wherein the wavelength of the beam is in the range of 200 nm to 650 nm.

14. The system of claim 10 wherein said laser used to encode said information emits light with a wavelength having an energy approximately equal to or larger than the band gap energy of the MN media.

15. The system of claim 7 wherein the thickness of the metal nitride layer is in the range of about 10 nm to 300 nm.

16. The system of claim 7 wherein the thickness of the metallized regions are less than or equal to about 200 nm.

17. The system of claim 7 wherein said beam means are also used to read said information.

18. The system of claim 17 wherein said beam means is a laser and said encoded information is read by rastering the beam from said laser across said medium and detecting the changes in reflectivity between the high reflectivity metallic regions and the low reflectivity metal nitride matrix.

19. the system of claim 7 further including additional beam means for reading said information.

20. A system for the processing of information comprising:
a) an optical recording medium consisting of a thin film of a metal alloy of composition $A_xB_yC_{1-x-y}N$ situated upon a substrate where A, B and C are different column III metals, x and y are numbers between 0 and 1 and N is nitrogen;
b) beam means for selectively irradiating regions of said medium to selectively convert discrete regions of said medium to the metal nitride to thereby form metallized regions of high reflectivity embedded in the metal nitride matrix, which metallized regions and matrix regions constitute encoded information; and
c) means for scanning said beam means across the surface of said medium.

21. The system of claim 20 wherein said irradiation produces a localized heating effect.

22. The system of claim 20 wherein the lateral dimensions of said metallized regions are comparable to the lateral dimensions of said beam.

23. The system of claim 20 wherein said beam means are a laser.

24. The system of claim 20 wherein the energy density of the beam required for encoding is on the order of 100 millijoules per square centimeter and the beam is delivered in a pulsed mode with a pulse time of a few nanoseconds.

25. The system of claim 24 wherein the diameter of the focussed beam is comparable to the wavelength of the beam.

26. The system of claim 23 wherein the wavelength of the light is in the range of 200 nm to 650 nm.

27. The system of claim 23 wherein said laser used to encode said information emits light with a wavelength from 200 nm to 650 nm and the gallium, aluminum, and indium composition of the recording medium adjusted so that the $Al_xGa_yIn_{1-x-y}N$ medium has a band gap that is approximately equal to the photon energy of the laser.

28. The system of claim 20 where the thickness of the metal nitride layer is in the range of about 10 nm to 300 nm.

29. The system of claim 20 where the thickness of the metallized regions are less than or equal to about 200 nm.

30. The system of claim 20 wherein said beam means are also used to read said information.

31. The system of claim 30 wherein said beam means is a laser and said stored information is read by rastering the beam from said laser across said medium and detecting the changes in reflectivity between the high reflectivity metal spots and the low reflectivity metal nitride.

32. The system of claim 20 further including additional beam means for reading said information.

33. A multiple-layer optical recording disk comprising a plurality of layers of an optical recording medium of a thin film of a metal nitride of composition MN where M is a metal selected from the column III metals and N is nitrogen.

34. The disk of claim 33 wherein each layer is situated on a substrate and said layer/substrate pairs are stacked with an air gap inbetween.

35. The disk of claim 33 wherein each layer is situated on a substrate and said layer/substrate pairs are stacked with a layer of transmissive glue inbetween.

36. The disk of claim 33 wherein a first layer is situated on a substrate and each subsequent layer is stacked thereupon with a layer of a transmissive material inbetween.

37. The disk of claim 36 further including a final layer of a protective material on the topmost layer.

38. The disk of claim 33 wherein each layer of optical recording medium has a different composition.

39. A multiple-layer optical recording disk comprising a plurality of layers of an optical recording medium of a thin film of a metal alloy of composition $A_xB_yC_{1-x-y}N$ where A, B and C are different column III metals, x and y are numbers between 0 and 1 and N is nitrogen.

40. The disk of claim 39 wherein each layer is situated on a substrate and said layer/substrate pairs are stacked with an air gap inbetween.

41. The disk of claim 39 wherein each layer is situated on a substrate and said layer/substrate pairs are stacked with a layer of transmissive glue inbetween.

42. The disk of claim 39 wherein a first layer is situated on a substrate and each subsequent layer is stacked thereupon with a layer of a transmissive material inbetween.

43. The disk of claim 42 further including a final layer of a protective material on the topmost layer.

44. The disk of claim 39 wherein each layer of optical recording medium has a different composition.

* * * * *